United States Patent [19]
Walters et al.

[11] Patent Number: 6,144,917
[45] Date of Patent: Nov. 7, 2000

[54] CALCULATION OF ESTIMATED TIME OF ARRIVAL (ETA) BASED ON THOROUGHFARE CLASSIFICATION AND DRIVING HISTORY

[75] Inventors: Thomas H. Walters, Gardner; Darin J. Beesley, Overland Park; Stephen C. Robinson, Olathe, all of Kans.

[73] Assignee: Garmin Corporation, Taiwan

[21] Appl. No.: 09/183,072

[22] Filed: Oct. 30, 1998

[51] Int. Cl.[7] .................................................. G08F 1/123
[52] U.S. Cl. .......................... 701/204; 701/201; 701/213; 340/988; 340/990; 340/995
[58] Field of Search ................................... 701/204, 201, 701/213; 340/988, 990, 995

[56] References Cited

U.S. PATENT DOCUMENTS 5,905,451  5/1999  Sakashita ................................. 340/988

*Primary Examiner*—William A. Cuchlinski, Jr.
*Assistant Examiner*—Arthur D. Donnelly
*Attorney, Agent, or Firm*—Shook, Hardy & Bacon L.L.P.

[57] ABSTRACT

A portable electronic navigational aid device and method calculates estimated time en route and estimated time of arrival. A user inputs a plurality of variables, including identity, cartographic data, final destination. Upon receiving the inputs, the device determines from cartographic data the estimated distance to the final destination and the type of thoroughfare the inputted trip will traverse. During operation, the device recalls the average driving velocity for the inputted driver over each different type of thoroughfare traversed. Using prestored average velocity data, the device calculates an initial estimated time en route and an estimated time of arrival for a desired route. The device continues to receive GPS data as to the driver's position and velocity and updates the average velocity record for that driver on the specific type of thoroughfare. As the average velocity fluctuates, the device adjusts the estimated time en route and the estimated time of arrival. The device further has control processes for potentially erroneous sampling. The device has a predetermined threshold in which data inputs below that threshold will not be averaged into the memory. The second control process of the present invention allows for zero velocity sampling without necessitating a reset of the entire system. If the device samples a zero speed, it will not average that velocity into the system as explained above. Rather, a stop time measured by a counter will be added to the estimated time en route and estimated time to arrival.

15 Claims, 5 Drawing Sheets

CALCULATION OF ESTIMATED TIME OF ARRIVAL (ETA) BASED ON THOROUGHFARE CLASSIFICATION AND DRIVING HISTORY

BACKGROUND OF THE INVENTION

1. Field of Invention

In general, this invention relates to a portable electronic device and more specifically, to a portable electronic navigation analysis device utilizing global positioning system data in calculating estimated time en route and estimated time of arrival.

2. Description of the Related Art

In general, the prior art discloses devices and methods which can calculate a vehicle's estimated time en route and estimated time of arrival. These devices implement a two-part analysis, measuring the vehicle's current velocity and then determining the distance to an established destination. To estimate time en route, some devices divide the distance to the destination by the current vehicle velocity to get an approximate estimated time en route. Additionally, calculating estimated time of arrival entails adding the current time of day to the calculated time en route.

These prior art devices are highly inaccurate for numerous reasons. Often, a vehicle's velocity fluctuates over a given short period. For example, if, at the time the device is sampling the vehicle's velocity, a driver happens to momentarily slow down, the estimated time en route will be inaccurate. Likewise, if the driver is temporarily proceeding at a faster rate than normal, the calculated time en route will be significantly less than the actual time it is likely to take to arrive at the destination.

A second deficiency in current prior art systems is that driving velocities necessarily fluctuate depending on the type of thoroughfare on which a driver is proceeding. For example, on a 4-lane highway, a driver may proceed at 65 mph. However, if the driver exits the highway to a 2-lane road, the average velocity may only be, for example, 25 mph. Therefore, if the sampling of vehicle velocity is done while the driver is on the highway, the calculated time en route will be inaccurate. Likewise, if the sampling of vehicle velocity is done while the driver is on a 2-lane road, the calculated time en route will be much longer than the actual time it is likely to take to arrive at the destination. Moreover, different drivers have different driving habits for different types of thoroughfares.

Finally, based on the equation used by prior art devices to calculate estimated time, if a driver is stopped at the time of sampling vehicle velocity, the velocity of the vehicle will be zero. Because distance is divided by speed, any distance divided by zero will result in an infinite amount of calculated time. Current systems do not account for zero velocity and therefore, the system must reset itself at every point in which a sample velocity is zero. Consequently, all current data is lost and the device must restart the entire process.

Global Positioning Systems (GPS) are well known in the prior art and have a variety of uses. In general, GPS is a satellite-based radio navigation system capable of determining continuous position and velocity information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its threedimensional position by the same geometrical calculation. The positioning and velocity data can be updated in real time on a continuous basis by an unlimited number of users.

Based on the above-mentioned deficiencies in the current time calculation devices, there is a need for a navigational analysis device which implements a method utilizing GPS technology that allows for fluctuations in vehicle speed, that can accommodate for the considerations of different types of thoroughfares, and that can sample zero velocity inputs without having to reset the entire system.

SUMMARY OF THE INVENTION

Based on the above noted deficiencies in the related art, it is an object of the present invention to provide a portable electronic navigational aid device which can calculate estimated time en route and estimated time of arrival. It is another object of the present invention to calculate average user driving speeds for different classes of thoroughfares. It is the further object of the present invention to provide a system that can accommodate for different driving velocities on different classes of thoroughfares. Finally, it is the object of the present invention to provide a system that can adjust for velocity fluctuations below a given threshold, including zero velocity sampling.

These and other objects of the present invention are achieved as a method and device for implementing global positioning data to calculate estimated time en route and estimated time of arrival. A vehicle is equipped with a portable electronic navigational aid device of the present invention capable of calculating estimated time en route and estimated time of arrival. A driver inputs a plurality of variables, including driver identity, cartographic data, final destination, as well as several potential additional variables. Alternatively, the cartographic data may be prestored in the navigation device. Upon receiving the driver inputs, the navigational aid device determines from the cartographic data the estimated distance to the final destination and the type of thoroughfare the inputted trip will traverse. In this regard, the cartographic data includes thoroughfares classified by type. For example, in U.S. terminology, an interstate highway may be the first class, a four-lane state highway may be the second class, a two-lane highway may be the third class, a boulevard or a trafficway may be the fourth class, a city street may be a fifth class and a nonpaved road may be a sixth class. Other classifications may be employed.

Upon initial use of the navigational aid device, as the driver travels, the navigational aid device calculates the vehicle's position and retrieves from the cartographic data in memory the type of thoroughfare upon which the driver is traveling. Additionally, the navigational aid device calculates the vehicle's velocity and stores the velocity in memory in association with the type of thoroughfare on which the driver is traveling. The velocity of the vehicle is periodically sampled and the memory is updated, with an average velocity calculated by a processor in the navigational aid device for the thoroughfare type being traversed.

This activity continues for each additional thoroughfare type traversed. It will be appreciated that over time, the stored average value for a given thoroughfare type will be accurately indicative of the driving habits of a particular driver for a particular type of thoroughfare.

As the operation continues, the navigational aid device recalls the average driving velocity for the inputted driver over each specific type of thoroughfare identified previously. Using the average velocity data, the navigational aid device calculates an initial estimated time en route and an estimated time of arrival for a desired route. Throughout the entire trip, the navigational aid device continues to receive GPS data as to the driver's position and velocity and updates the average velocity record for that driver on the specific type of thoroughfare. As the average velocity fluctuates, the navigational aid device adjusts the estimated time en route and the estimated time of arrival. The system will continue to sample data until the destination is reached or the user disengages the system.

As two additional unique features, the navigational aid device has control processes for potentially erroneous sampling. Each navigational aid device has a predetermined threshold in which data inputs below that threshold will not be averaged into the memory. A typical threshold is ½ of the average calculated velocity for that particular type of thoroughfare. Therefore, if on any type of thoroughfare the sampled velocity is below ½ of the average stored speed, the new sampling will not be averaged into the memory. It will be appreciated by someone skilled in the relevant art that a threshold other than ½ could be employed. The second control process of the present invention allows for zero velocity sampling without necessitating a reset of the entire system. If the navigational aid device samples a zero speed, it will not average that velocity into the system as explained above. Instead, a time counter will begin measuring the stop time until the zero velocity is no longer detected. The time measured by the counter will then be added to the estimated time en route and estimated time to arrival to account for the period in which the vehicle was not moving.

These as well as other novel advantages, details, embodiments, features, and objects of the present invention will be apparent to someone skilled in the art from the following detailed description of the invention, the attached claims and accompanying drawings, listed herein below, which are useful in explaining the invention.

BRIEF DESCRIPTION OF THE DRAWINGS

Objects and features of the invention noted above are explained in more detail with reference to the drawings, and in which like reference numerals are used to indicate like parts in the various views.

DETAILED DESCRIPTION OF THE PREFERRED EMBODIMENTS

For a better understanding of the present invention, reference may be had to the following detailed description taken in conjunction with the appended claims and accompanying drawings. In essence, the present invention enables a portable electronic navigational aid device to calculate estimated time en route and estimated time of arrival. Utilizing Global Positioning Systems (GPS) data and internal memory, the navigational aid device can account for variations in individual driving speed, variations in speeds on different types of thoroughfares and zero or low velocity adjustments in calculating predicted times and updating memory.

Figure 1:
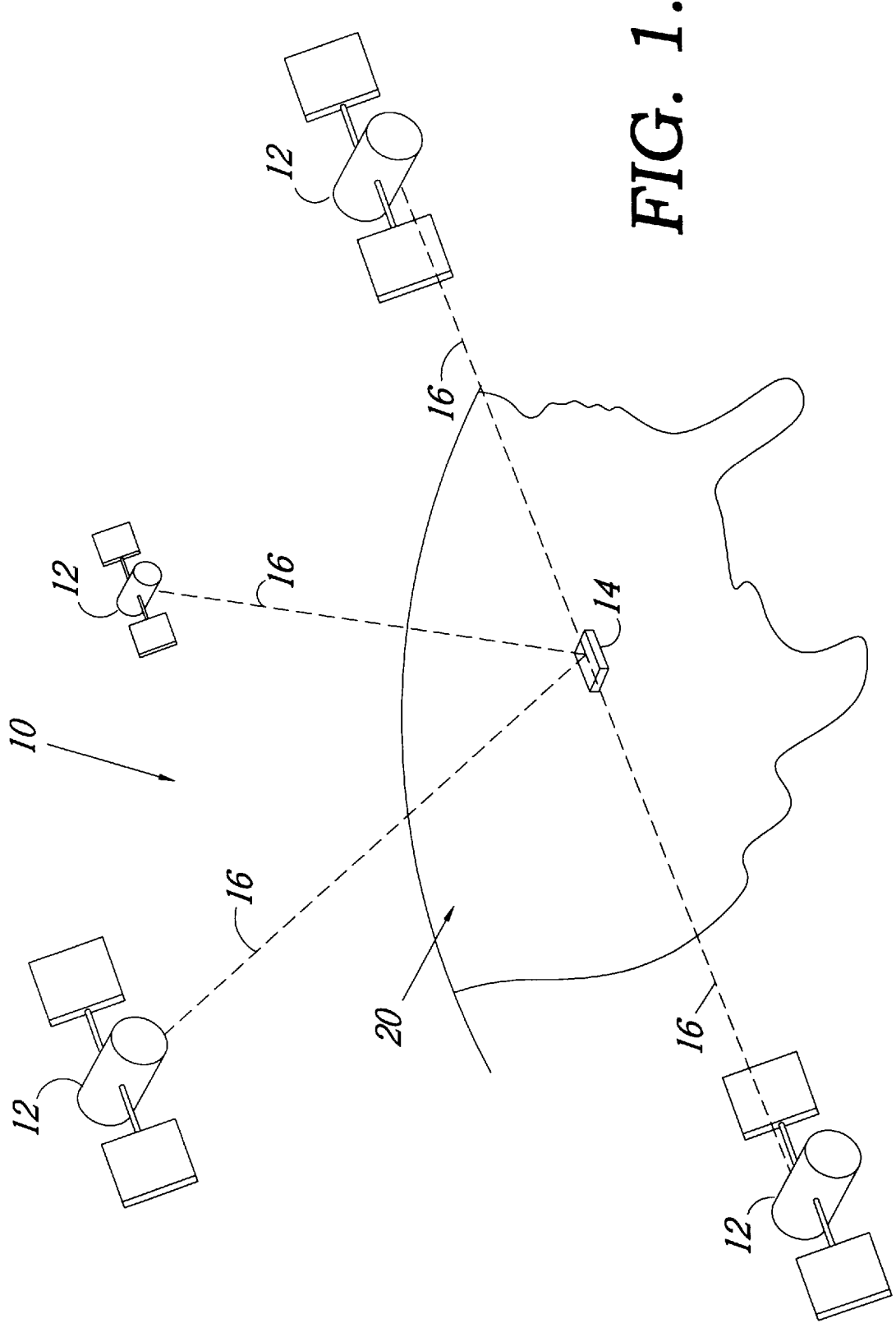
FIG. 1 is a representative of a GPS system.

FIG. 1 denotes a representative of a GPS system denoted by reference numeral 10. A plurality of satellites 12 are in orbit about the Earth 20. The orbit of each satellite 12 is not necessarily synchronous with the orbits of other satellites 12 and, in fact, is likely asynchronous. A GPS receiver device 14 of the present invention is shown receiving spread spectrum GPS satellite signals 16 from the various satellites 12.

The spread spectrum signals 16 continuously transmitted from each satellite 12 utilizes a highly accurate frequency standard accomplished with an extremely accurate atomic clock. Each satellite 12, as part of its data signal transmission 16, transmits a data stream indicative of that particular satellite 12. It will be appreciated by those skilled in the relevant art that the GPS receiver device 14 must acquire spread spectrum GPS satellite signals 16 from at least three satellites 12 for the GPS receiver device 14 to calculate its two-dimensional position by triangulation. Acquisition of an additional signal 16, resulting in signals 16 from a total of four satellites 12, permits GPS receiver device 14 to calculate its three-dimensional position.

Figure 2:
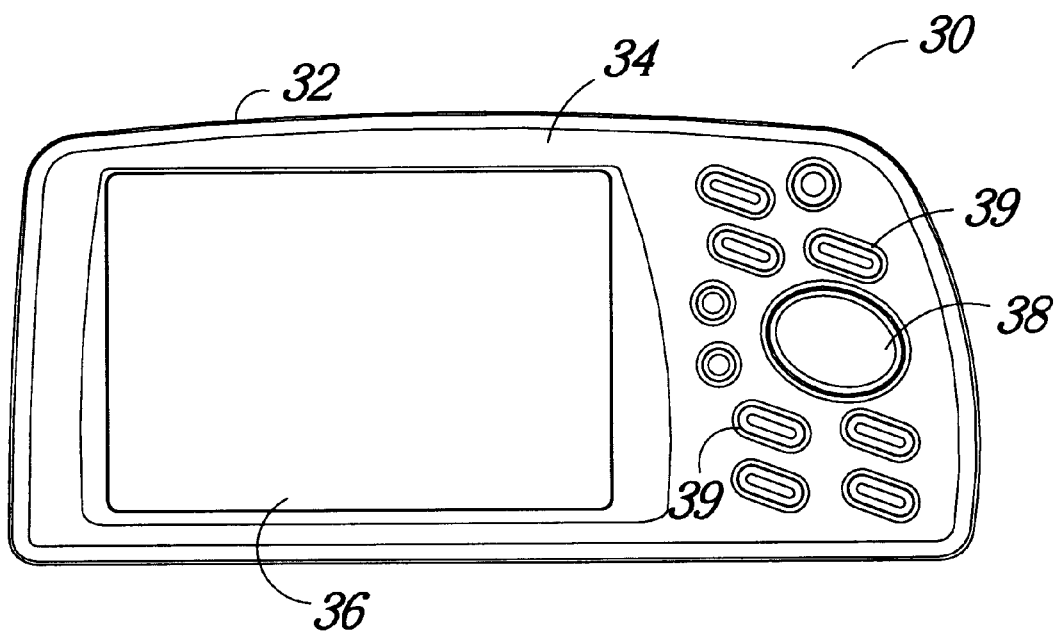
FIG. 2 is a front elevational view of the portable electronic navigational aid device of the present invention.
Figure 3:
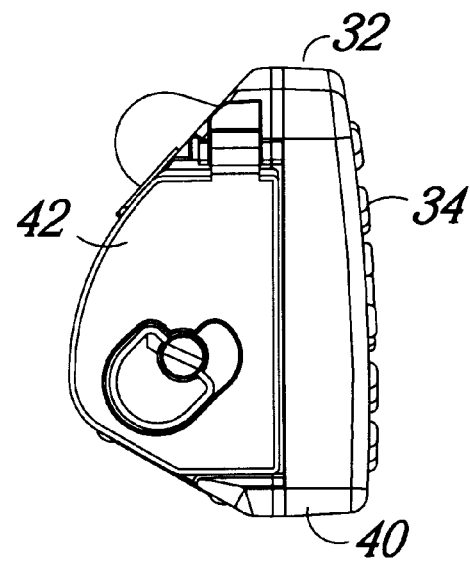
FIG. 3 is a side view of the portable electronic navigational aid device of the present invention.

FIGS. 2 and 3 are representative of the portable electronic navigational aid device of the present invention, which is denoted generally by reference numeral 30. The navigational aid device has a generally rectangular housing 32 which is constructed of a resilient material and has been rounded for aesthetic purposes. The device housing 32 is defined by an outer front case 40 and a rear case 42, with the outer front case defined by a control face 34. The control face 34 has access slots for input keypad 38, which has individual keys 39, and a display screen 36. The display screen 36 is a LCD display which is capable of displaying both text and graphical information. The outer front case 40 and rear case 42 are made of one molded piece interconnecting to form the device housing 32 and support input keypad 38 and display screen 36 in their respective access slots in the control face 34.

Figure 4:
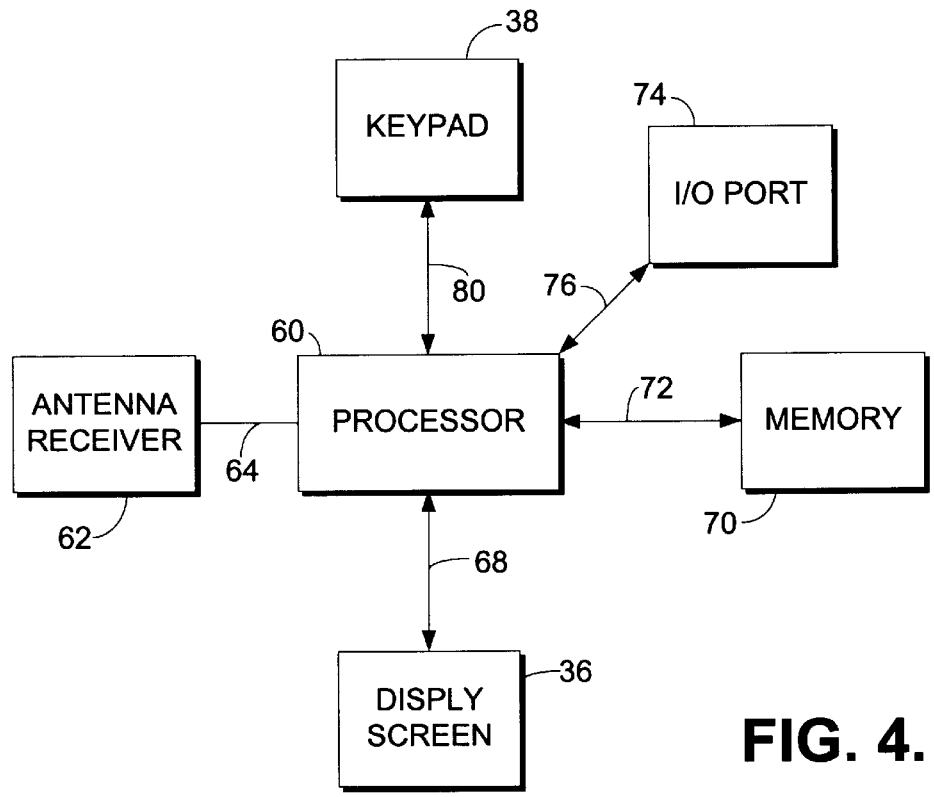
FIG. 4 is a block diagram of the typical components in a GPS receiving device.

FIG. 4 is a block diagram of the electronic circuit within the housing 32 and utilized by the portable electronic navigational aid device 30. The electronic circuit includes a processor 60 which is connected to the GPS antenna/receiver 62 via line 64. The processor 60 communicates with display screen 36 via data line 68. The memory, designated generally by numeral 70, is connected to processor 60 via data line 72. The electronic circuit further includes two input sources that are connected to the processor 60. I/O port 74 is connected via data line 76 and the keypad 38 is connected via data line 80. The electronic circuitry is powered by a power source (not shown) in a conventional manner.

Figure 5:
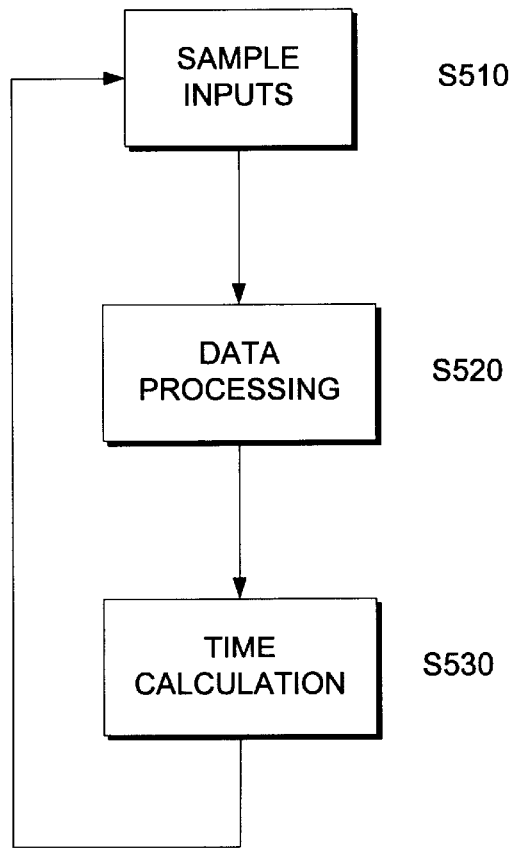
FIG. 5 is a flow diagram of the system process implemented by the electronic navigational aid device of the present invention.

FIG. 5 is a flow diagram of the method implemented by the portable electronic navigational aid device 30. Processor 60 samples input data from user inputted controls via the input keypad 38, the GPS receiver antenna 62 and the I/O port 74 as represented by Step S510. Via the keypad 38, the user inputs the identity of the driver, and a desired final location. The antenna/receiver 62 will acquire the GPS signals with which the processor 60 will calculate the vehicle's current position and velocity. In addition, the navigational aid device 30 must have cartographic data encompassing the entire area to be traversed stored in a memory which may be, for example, data stored on a data cartridge used in conjunction with device 10.

Figure 6:
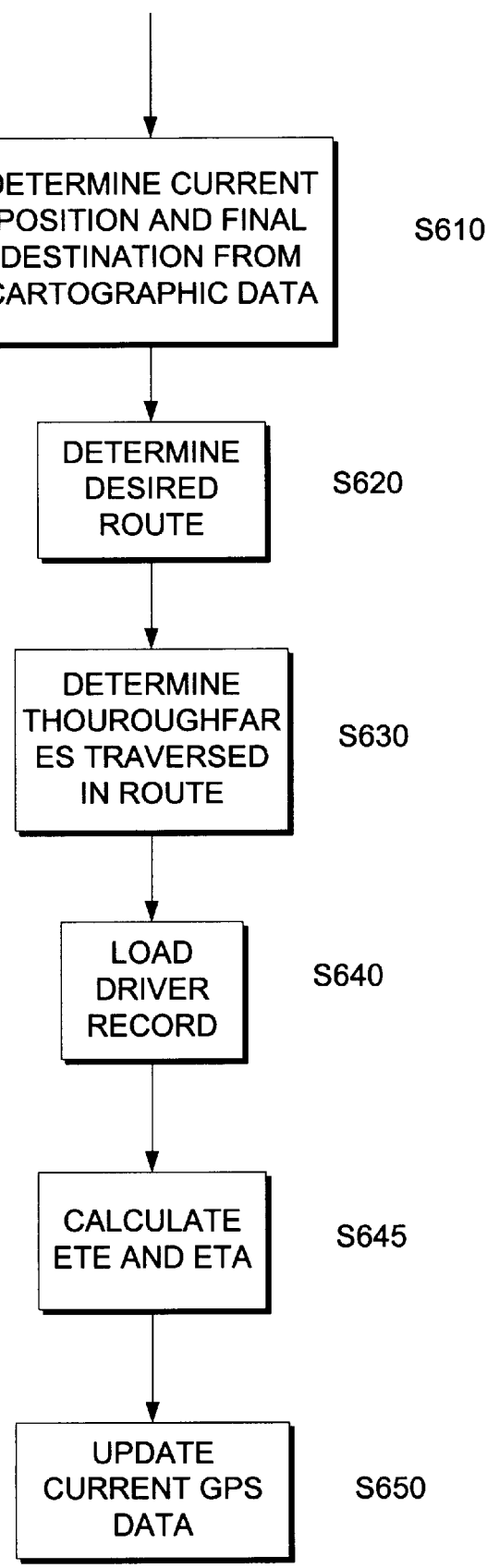
FIG. 6 is an expanded flow diagram of the subroutines within the data processing system process.

FIG. 6 is an expanded flow diagram representative of the processing operation of device 10. With memory 70 containing average speed data for each type of thoroughfare, the initial step in the data processing routine entails the processor 60 locating the inputted final destination and the vehicle's current calculated position as represented by Step S610. After locating the final destination and the current vehicle position, the processor 60 calculates the desired route for the trip. This step is represented in FIG. 6 as Step S620. Alternatively, the user may insert the route using keypad 37.

After the route is established and stored in memory 70, the processor 60 determines the different types of thoroughfares that the desired route will traverse from the cartographic data, as represented in Step S630. After identifying the type of thoroughfare classification, the processor 60 accesses and loads the driving velocities for the inputted driver from memory 70. This step is represented as Step S640. As indicated in Step S645, the processor 60 calculates the estimated time of arrival (ETA) and the estimated time en route (ETE) based upon the route to be traversed and the velocities stored in memory 70 for each type of thoroughfare along the route. In this regard, it will be understood from the foregoing that, as the driver/user proceeds along the route, and the device 10 calculates the location and velocity, the velocity is stored in memory for the particular class of thoroughfare being traversed as represented in FIG. 6 by Step S650. Moreover, the velocity is periodically sampled, and an average velocity for the thoroughfare type is calculated and stored in memory 70. Over time, device 10 has stored in memory 70 average velocities of travel for each type of thoroughfare in memory 70.

Figure 7:
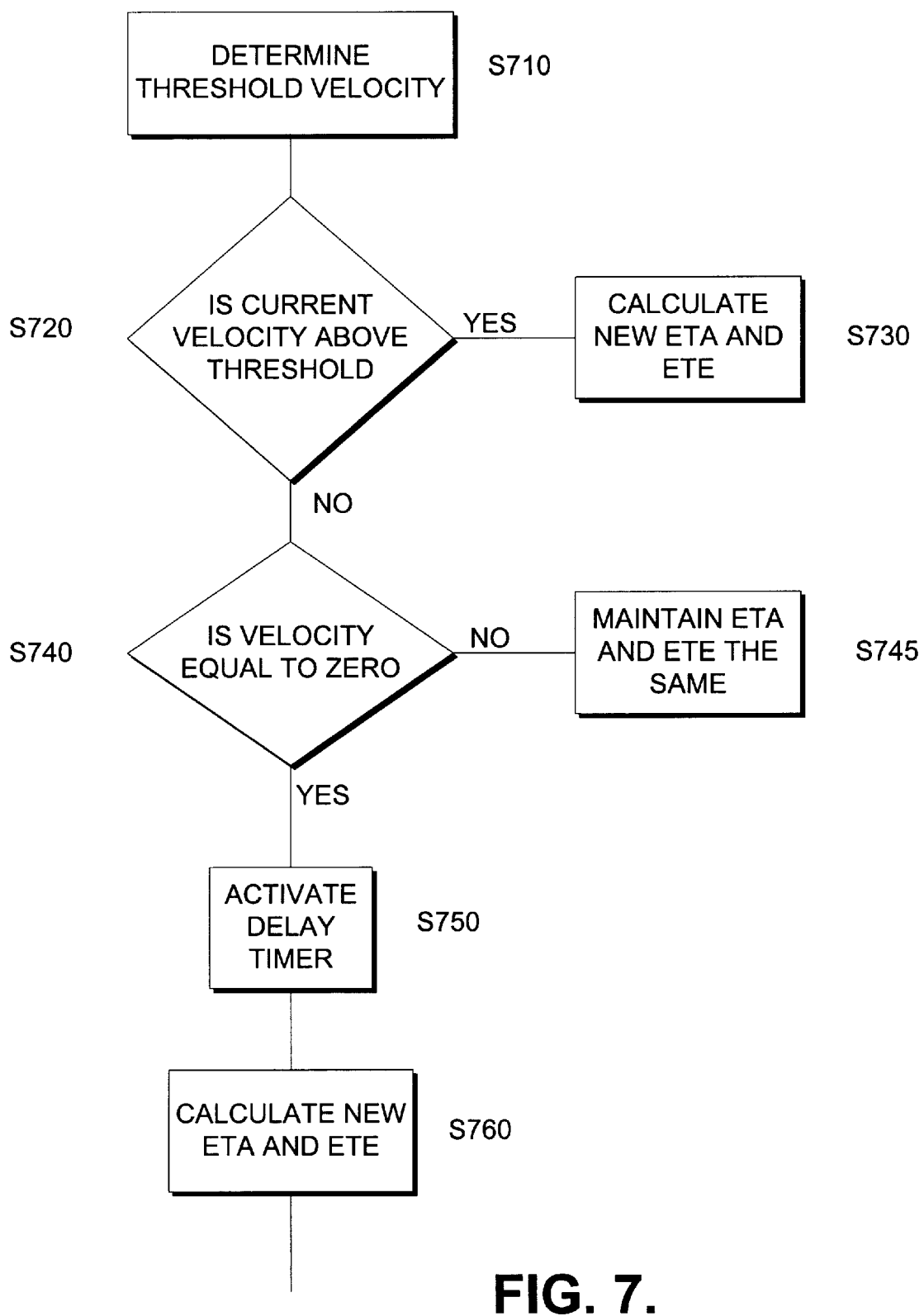
FIG. 7 is a block diagram of the error correction subroutine of the data processing system process.

Additionally, the processor 60 conducts an error correction subroutine, as illustrated in FIG. 7, before averaging the current vehicle velocity to the appropriate thoroughfare classification within the specific driver database. It will be understood that the error correction subroutine is not necessary to the improved calculation method of the present invention, but rather is an additional and separable improvement.

FIG. 7 represents a block diagram of the error correction subroutine of the present invention. Before the processor 60 averages the current vehicle velocity for the appropriate thoroughfare classification, the processor 60 multiplies the average vehicle velocity for the applicable thoroughfare classification by a threshold multiplier that is preset during the implementation of the system. This step is represented by Step S710. In a preferred embodiment, the threshold multiplier is ½. Other embodiments within the scope of the present invention can include systems in which the threshold multiplier can be variable or be a user input. The product of the average velocity and the threshold multiplier will be the minimum threshold velocity that the processor 60 uses to update the average vehicle velocity for the thoroughfare classification. The processor 60 then compares the current sampled velocity with the threshold velocity as represented by the decision box in Step S720. If the current sampled velocity is greater than the threshold velocity, the processor 60 averages the current vehicle velocity to the average velocity record. This alternative is represented by Step S730. If the current sampled velocity is not greater than the threshold velocity, the processor 60 does not average the current sampled vehicle velocity to the average velocity record.

At Step S740, the processor 60 determines if the current sampled vehicle velocity is equal to zero. If the current sampled vehicle velocity is equal to zero, then the processor 60 begins a running counter to measure the time the vehicle is still at zero velocity as represented by Step S750. The time measured by the counter will be added to the ETA and the ETE by the processor 60. This is represented by Step S760. Alternatively, if the processor 60 determines at Step S740 that the vehicle velocity is not equal to zero, the processor 60 does not change the ETA or the ETE as indicated in Step S745.

After every successive estimated time calculation, the portable electronic navigational aid device 30 will begin the time estimation process over. As referenced by FIG. 5, after the time calculation step represented by step S530 and explained in FIGS. 6 and 7, the processor loops back to Step S510 and begins the process anew. By continuously cycling through the process, the navigational aid device accounts for variations in driving velocity.

In the foregoing specification, the present invention has been described with reference to specific exemplary embodiments thereof The invention is considered to have been described in such full, clear, concise and exact terms as to enable a person of ordinary skill in the art to make and use the same. It will be apparent to those skilled in the art, that a person understanding this invention may conceive of changes or other embodiments or variations, which utilize the principles of this invention without departing from the broader spirit and scope of the invention as set forth in the appended claims. All are considered with the sphere, spirit and scope of the invention. The specification and drawings are, therefore, to be regarded in an illustrative rather than restrictive sense. Accordingly, it is not intended that the invention be limited except as may be necessary in view of the appended claims or their equivalents, which particularly point out and distinctly claim the subject matter applicants regard as their invention.

What is claimed is:

1. A portable electronic navigational aid device for assisting a driver of a vehicle, said device comprising:
    a processor;
    a display connected to said processor; and
    a memory connected to said processor, said memory having cartographic data and a route stored therein, said cartographic data including data indicative of thoroughfares of a plurality of types, wherein said device determines data indicative of the driving habits of said driver for each said type of thoroughfare, stores said driving habit data in said memory, and calculates its current position, and wherein said processor determines an estimated time enroute based upon said driving habit data.

2. The portable electronic navigational aid device for assisting a driver of a vehicle as recited in claim 1, wherein said driving habit data for each type of thoroughfare is comprised of an average driving velocity.

3. The portable electronic navigational aid device for assisting a driver of a vehicle as recited in claim 2, wherein said processor, when determining said average driving speed, eliminates data indicative of driver velocity below a selected threshold speed.

4. The portable electronic navigational aid device for assisting a driver of a vehicle as recited in claim 2 wherein, when said vehicle is stopped, said processor calculates the time said vehicle is stopped and then adds said stopped time to said estimated time en route.

5. A portable electronic navigational aid device for assisting a driver of a vehicle, said device comprising:

a processor;

a display connected to said processor;

an input connected to said processor, wherein said input comprises a keypad, an I/O port for accepting preprogrammed cartographic data in data cartridges, and an antenna receiver;

a memory connected to said processor, said memory having cartographic data including data indicative of a first thoroughfare of a first type and a second thoroughfare of a second type; and a housing, said housing for containing said processor, said display, said input, and said memory, wherein said processor determines driving habits of said driver for each type of said thoroughfare and stores said driving habit data into said memory.

6. The portable electronic navigational aid device for assisting a driver of a vehicle as recited in claim 5, wherein said I/O port accepts preprogramed cartographic data in data cartridges.

7. The portable electronic navigational aid device for assisting a driver of a vehicle as recited in claim 5, wherein said processor determines an average velocity of said device, corresponding to said driver for each thoroughfare classification.

8. The portable electronic navigational aid device for assisting a driver of a vehicle as recited in claim 5, wherein said portable electronic navigational aid device is mountable on said vehicle.

9. A portable electronic navigational aid device for use by a user, said device comprising:

a processor;

a display, and an input, wherein said input is comprised of a keypad, an I/O port and an antenna receiver, said I/O port accepting preprogramed cartographic data, said cartographic data further comprised of classification of thoroughfare types and personalized average velocity of said user for each said thoroughfare classification.

10. The portable electronic navigational aid device as recited in claim 9, wherein said portable electronic navigational aid device is mountable on a vehicle.

11. A portable electronic navigational aid method, such method comprising:

a means for sampling the current position of the vehicle;

a means of sampling the desired destination of the vehicle;

a means for determining the thoroughfare classification the vehicle is currently on;

a means for processing said input data, said input data processing means comprising means for recalling said average velocity of every thoroughfare classification, a means for updating said average velocity to reflect current driving data, and a means for storing average velocity driving data for every thoroughfare classification; and a means for calculating time estimations from said processing.

12. The portable electronic navigational aid method as recited in claim 11, wherein said means for processing said input data comprising:

a means for excluding total stop time from average velocity calculation; and a means for including said total stop time into time estimations.

13. The portable electronic navigational aid method as recited in claim 11, wherein said means for calculating time estimations from said processing comprising:

a means for calculating estimated time en route; and a means for calculating estimated time of arrival from said processing and said estimated time en route.

14. A portable electronic navigational aid method, such method comprising:

a means for sampling the current position of vehicle;

a means for sampling the desired destination of the vehicle;

a means for determining the thoroughfare classification the vehicle is currently on;

a means for processing said thoroughfare classification data, said processing comprised of a means for recalling said average velocity for every thoroughfare classification, a means for updating said average velocity to reflect current driving data, a means for storing average velocity driving data for every thoroughfare classification, a means for excluding total stop time from average velocity calculation and a means for including said total stop time into time estimations a means for calculating estimated time en route from said processing;

a means for calculating estimated arrival time from said processing and said estimated time en route.

15. A portable electronic navigational aid device for assisting a driver of a vehicle, said device comprising:

a processor;

a display connected to said processor;

a memory connected to said processor, said memory having a navigational route stored therein, wherein said device calculates its current position and its current velocity, and said processor determines an estimated time to traverse said route and, when said vehicle is stopped for a time, said processor calculates said stopped time and adds said stopped time to said estimated time to traverse said route.

* * * * *